United States Patent [19]

Yates

[11] Patent Number: 4,816,932

[45] Date of Patent: Mar. 28, 1989

[54] CIRCUIT FOR PROVIDING A SYMMETRIC CURRENT TO THE HEAD OF A MAGNETIC RECORDING DEVICE

[75] Inventor: Robert H. Yates, Santa Ana, Calif.

[73] Assignee: Archive Corporation, Costa Mesa, Calif.

[21] Appl. No.: 928,472

[22] Filed: Nov. 7, 1986

[51] Int. Cl.⁴ .............................................. G11B 5/09
[52] U.S. Cl. ......................................... 360/46; 360/68
[58] Field of Search ..................... 360/46, 61, 63, 68

[56] References Cited

U.S. PATENT DOCUMENTS

| | | | |
|---|---|---|---|
| 4,521,817 | 6/1985 | Sasamura et al. | 360/46 |
| 4,551,772 | 11/1985 | Sliger | 360/46 |

FOREIGN PATENT DOCUMENTS

| | | | |
|---|---|---|---|
| 0135316 | 10/1980 | Japan | 360/46 |
| 0041403 | 3/1983 | Japan | 360/68 |
| 0080109 | 5/1983 | Japan | 360/68 |

OTHER PUBLICATIONS

Marshall, S. E., "Disk File Write Current Generator", IBM TDB, vol. 23, No. 3, Aug. 1980.
Ainscow, F., "Write Current Stabiliser for Multielement Magnetic Head", IBM TDB, vol. 15, No. 8, Jan. 1973.
Chaloupka et al., "Magnetic Head Write Driver", IBM TDB, vol. 13, No. 8, Jan. 1971.
Walter G. Jung, "IC OP-AMP Cookbook", 1974, pp. 175-176, Archive Drawing No. 50218-001.

Primary Examiner—Vincent P. Canney
Assistant Examiner—Surinder Sachar
Attorney, Agent, or Firm—Knobbe, Martens, Olson & Bear

[57] ABSTRACT

A write circuit for a streaming cartridge tape drive provides a substantially constant and symmetric write current to the magnetic write heads in the drive. The write current is provided by a pair of transistors coupled to the write head and the magnitude of the write current is maintained substantially constant by an operational amplifier coupled to the two write current transistors which regulates the voltage at the emitters of the two write current transistors.

28 Claims, 1 Drawing Sheet

CIRCUIT FOR PROVIDING A SYMMETRIC CURRENT TO THE HEAD OF A MAGNETIC RECORDING DEVICE

BACKGROUND OF THE INVENTION

This invention relates to streaming cartridge tape drives, and more particularly to a streaming cartridge tape drive incorporating a current control circuit for delivering a constant and a symmetric write current to the magnetic write heads in the drive.

Streaming cartridge tape drives provide mass storage of magnetic information by writing long streams of serial data in a plurality of parallel streams on magnetic tape. The magnetic tape includes many such parallel data streams, each stream being written at a different vertical position on the tape. When the tape drive completes writing a serial data stream along the entire length of the tape at one vertical position on the tape, the tape drive reverses the direction of the tape and writes another serial data stream at a second vertical position on the tape. This back and forth method of recording data in a plurality of parallel streams on magnetic tape is called serpentine recording, and is well known in the streaming cartridge tape drive art.

Serpentine recording is advantageous in that it maximizes the amount of magnetic tape utilized by eliminating tape starts and stops inherent in tape drives which simultaneously record a plurality of data tracks along the entire width of the tape. To achieve high data transfer rates, streaming cartridge tape drives have relatively high speed transport systems which transport the magnetic tape past the magnetic heads at rates of speed of up to 90 inches per second.

Magnetic information is recorded on the tape as a series of magnetic poles, the transition between each differing magnetic pole representing a bit of information. The magnetic poles are produced by providing an alternating write current to the magnetic write head. The write current is first provided in one direction in the winding of the magnetic head to produce a magnetic pole and then in the opposite direction in the winding to produce an opposite magnetic pole on the tape. Because the magnitude of the write current affects the strength of the magnetic poles on the tape, it is highly desirable to ensure that the write current from one tape drive to another tape drive is substantially constant in order to enhance data integrity. It is also very desirable that within each tape drive, the write current provided in one direction in the magnetic write head winding is substantially equal in magnitude to the write current provided in the opposite direction in the winding. Write currents which are substantially equal in both directions in the write head winding are considered to be symmetric. When write current is symmetric and also constant from one tape drive to another, the accuracy of the retrieval of the magnetic information written to magnetic tape is maximized.

Streaming cartridge tape drives typically incorporate a pair of transistors connected to the winding of a magnetic write head in order to provide the write current to the head. The magnitude of the write current provided by these transistors depends on a number of factors which include the electrical tolerances of the associated biasing elements, such as resistors and power supplies, as well as the electrical characteristics of the transistors themselves. For example, each transistor has a baseemitter voltage $V_{be}$ which is dependent upon the electrical characteristics of the transistor. The value of $V_{be}$ varies from transistor to transistor and varies within a transistor as the temperature changes. These variances produce nonuniformities in the magnitude of the write current supplied to the magnetic write head. Since different transistors are used to provide current in different directions in the windings of the write head, the current supplied to the write head is asymmetric; that is, the magnitude of the current through the winding of one direction is not equal to the magnitude of the current in the winding in the opposite direction.

In addition, since the transistors and associated biasing elements in one tape drive may have different electrical characteristics than the transistors and biasing elements in another tape drive, the write current produced from tape drive to tape drive may vary. This variance in the magnitude of write current from drive to drive, as well as its asymmetry, adversely affect the accuracy of subsequent information retrieval from the tape.

SUMMARY OF THE INVENTION

This invention solves these problems by providing a substantially constant write current to the magnetic write head in a streaming cartridge tape drive. The tape drive includes a first circuit for providing a write current through the winding in a write head in a first direction and a second circuit for providing a write current through the winding in a write head in the opposite direction. The tape drive also includes a circuit for regulating the current provided by the first and second circuits so that the magnitude of the write current provided to the windings in the write head is independent of the electrical characteristics of the first and the second circuits.

In another aspect, the invention includes a streaming cartridge tape drive which provides a substantially symmetric write current. The tape drive includes a first circuit for producing a write current through the winding of the write head in a first direction and a second circuit for producing a current through the winding in the opposite direction. The tape drive also includes a circuit for regulating the magnitude of the write current provided by the first circuit and the second circuit so that the magnitude of the write current provided in each direction of the winding in the write head is substantially equal.

Thus, an object of the invention is to provide a streaming cartridge tape drive having a symmetric write current.

Another object of the invention is to provide a substantially constant write current in order to eliminate write current variations from tape drive to tape drive.

These and other objects, features, and advantages of this invention will be apparent in view of the following detailed description of a preferred embodiment, which is explained with reference to the FIGURE, a brief description of which is provided below.

BRIEF DESCRIPTION OF THE DRAWINGS

The FIGURE is a circuit diagram of a write circuit in accordance with the invention.

DETAILED DESCRIPTION OF A PREFERRED EMBODIMENT

Figure 1:
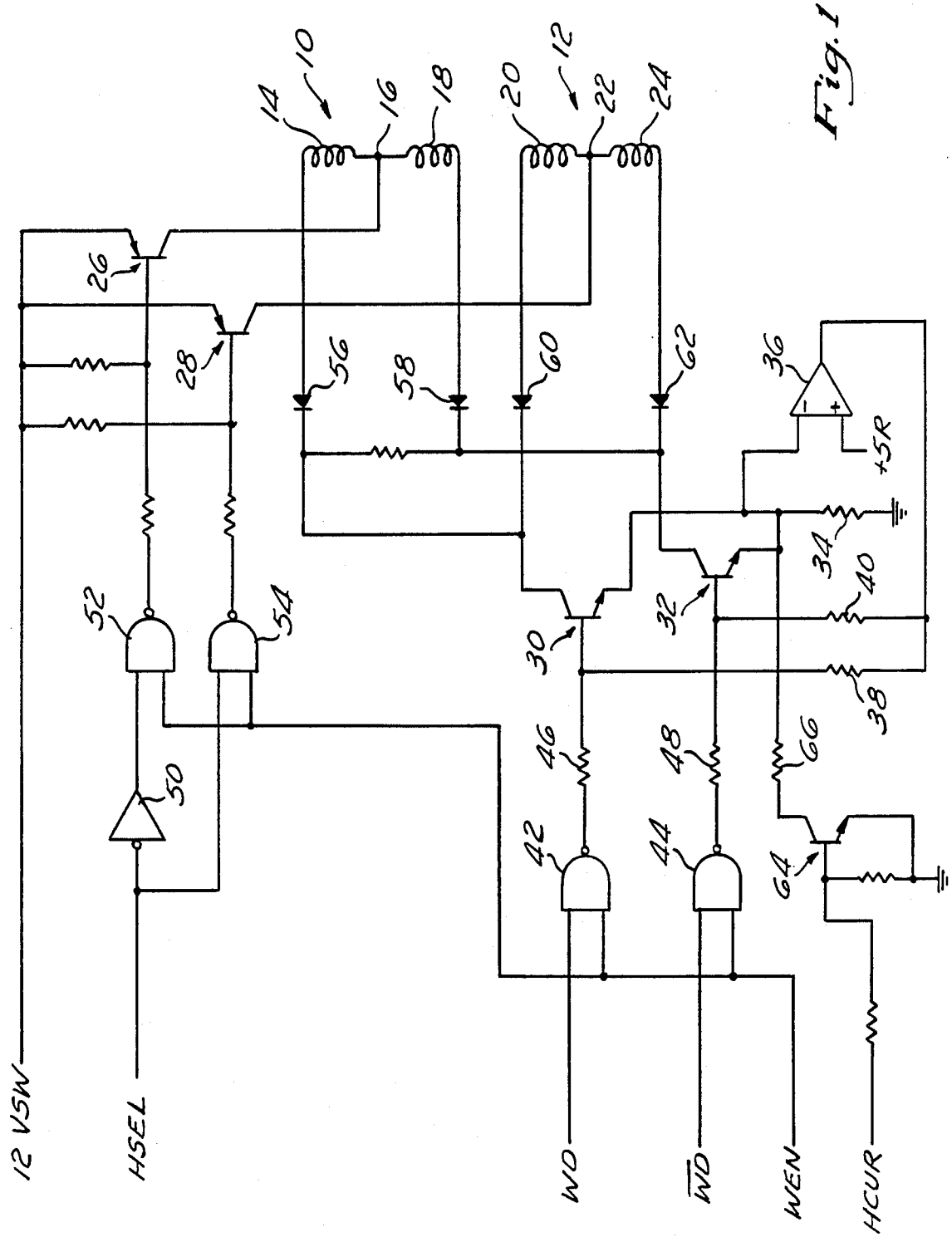

A write circuit is illustrated in the FIGURE. The write circuit is used in connection with a pair of magnetic write heads (not shown) in a streaming cartridge tape drive for recording magnetic information on magnetic tape in a serpentine fashion. The tape drive includes a conventional tape transport system (not shown) for transporting the magnetic tape past the write heads to facilitate the writing of magnetic information to the tape.

The write heads have a pair of center-tapped windings 10, 12 through which write current flows. The winding 10 has an upper portion 14, a center tap 16, and a lower portion 18, and the winding 12 has an upper portion 20, a center tap 22, and a lower portion 24. The center taps 16, 22 of the windings 10, 12 are connected to a pair of transistors 26, 28 which are coupled to a switched power supply. The ends of the windings 10, 12 are coupled to a pair of switching transistors 30, 32 which have their emitters connected to a current control resistor 34, which is a precision tolerance resistor with an actual resistance value which is within 1% of its stated value. The emitters of the switching transistors 30, 32 are also connected to the inverting input of an operational amplifier 36 which has its noninverting input connected to a five volt reference source with a ±1% tolerance. The output of the amplifier 36 is coupled to the bases of the transistors 30, 32 through a pair of resistors 38, 40. The bases of the transistors 30, 32 are also connected to a pair of NAND gates 42, 44 through a pair of resistors 46, 48, respectively.

In operation, the write circuit energizes only one of the windings 10, 12 at a time since the tape drive only uses one write head at a time to record magnetic information to the tape. In order to select one of the write heads for recording, a head select ("HSEL") signal is provided to selectively turn on one of the transistors 26, 28. When one of these transistors 26, 28 is turned on, it provides a high voltage to its respective center tap of the windings 10, 12, which enables current flow through the winding if one of the two switching transistors 30, 32 is in a conducting state. When the transistors 26, 28 are turned off, no high voltage is supplied to the center taps 16, 22, and thus no current passes through the windings 10, 12.

The value of the HSEL signal provided to the transistor 26 is complemented with respect to its value as supplied to the transistor 28 by means of an inverter 50. This ensures that only one of the transistors 26, 28 will be turned on at a time, and thus only one of the write heads will be energized at a time.

The write circuit also incorporates a pair of NAND gates 52, 54 connected to the bases of the transistors 26, 28. The $\overline{\text{HSEL}}$ and HSEL signals are supplied to the NAND gates 52, 54 respectively, as well as a write enable ("WEN") signal. If the WEN signal is not activated, neither of the transistors 26, 28 will be turned on, regardless of the HSEL signal. The WEN signal thus prevents the recording of magnetic information to the tape in certain circumstances, for example, when a write protect tab has been activated in the tape cartridge.

The WEN signal is also used to enable the switching transistors 30, 32 in a manner similar to that described above in connection with the transistors 26, 28. To this end, the WEN signal is provided along with a pair of write data ("WD" and "$\overline{\text{WD}}$") signals to the NAND gates 42, 44 coupled to the bases of the transistors 30, 32.

When one of the windings 10, 12 has been energized, the switching transistors 30, 32 are switched on and off by the WD and $\overline{\text{WD}}$ signals at the data recording rate to alternate the direction of current through the energized winding. Since the WD and $\overline{\text{WD}}$ signals are always complementary, only one of the transistors 30, 32 will be turned on at a time. For example, assume that a high voltage has been provided to the center tap 22 of the winding 12 by the transistor 28. When the switching transistor 30 is turned on by the WD signal and the transistor 32 is turned off by the $\overline{\text{WD}}$ signal, write current flows from the center tap 22 through the upper winding portion 20, the transistor 30, and the current control resistor 34. When the transistor 30 is turned off and the transistor 32 is turned on, current flows from the center tap 22 downward through the lower winding portion 24, the transistor 32, and the resistor 34. Since the direction of current through the winding 12 alternates, alternate magnetic poles are produced on the tape.

An important feature of the write circuit is the cooperation of the transistors 30, 32 with the operational amplifier 36 and the resistors 38, 40. The operational amplifier 36, which is an LF353 commercially available from Motorola, Inc., holds the voltage at the emitters ("$V_e$") of the two switching transistors 30, 32 equal to the voltage supplied by the five volt reference source. The operational amplifier 36 accomplishes this by regulating the base currents of the transistors 30, 32 by varying its output voltage. In particular, when one of the transistors 30, 32 is turned on, the voltage at its base is substantially constant, at approximately 5.6 volts, due to its emitter voltage, which is held equal to 5.0 volts, and its $V_{be}$ turn-on voltage of 0.6 volts. The operational amplifier 36 supplies a voltage of slightly more than 5.6 volts to the resistors 38, 40 to inject the base current necessary to provide an emitter current that provides a 5.0 volt drop across the current control resistor 34, which in this embodiment, has a value of 332 ohms with a 1% tolerance. Thus, the emitter current has a value of 15 milliamperes. Since the collector current is substantially equal to the emitter current, the magnitude of the write current through the write head windings 10, 12 is also substantially 15 milliamperes. In order to provide this 15 milliampere emitter current, the amplifier 36 must provide a base current of approximately 0.15 milliamperes, since the transistors 30, 32 have a current gain $\beta$ of approximately 100. Since the resistors 38, 40 both have a resistance of 1000 ohms in this embodiment, the operational amplifier 36 provides an output voltage of approximately 0.15 volts above the 5.6 base voltage of the transistors 30, 32.

As described above, the WD and $\overline{\text{WD}}$ signals input to the NAND gates 42, 44 control the switching of the transistors 30, 32. More particularly, if its input is logic "1," the NAND gate 42 effectively connects the base of the transistor 30 to ground through the resistor 46, which in this embodiment has a value of 470 ohms. When so connected, the approximate 5.75 volts provided by the operational amplifier 36 is divided between the resistors 38, 46, providing a base voltage of less than 5.6 volts, thus leaving the transistor 30 off.

However, when its input is logic "0," the NAND gate 42, which is a 74LS26 commercially available from Motorola, Inc. and has an open collector, presents an open circuit to the base of the transistor 30. In this case, the 5.75 volts supplied by the operational amplifier 36 is not divided across the resistor 46, but instead turns the transistor 30 on to provide the constant emitter current as described above. The NAND gate 44 switches the transistor 32 in the same manner. Like the resistor 46, the resistor 48 also has a resistance value of the 470 ohms.

The above description is made with reference to particular voltages, currents, resistance values and transistor values only for purposes of clarity in the explanation of the write circuit. Of course, the advantages of the write circuit would be obtained if different resistance and transistor values were used, and thus the invention is not limited to the particular circuit values described above.

As described above, the magnitude of the write current through the transistors 30, 32 is equal to the emitter voltage $V_e$ divided by the value R of the current control resistor 34. Since the operational amplifier 36 holds the emitter voltage $V_e$ equal to the voltage supplied by the five volt reference source, the emitter voltage is precisely controlled to within substantially 1%. Thus, since the write current is substantially determined only by the emitter voltage $V_e$ and the resistance of the resistor 34, the magnitude of the write current is not affected by the electrical characteristics of the two transistors, such as the base-emitter voltage $V_{be}$ or the variance of $V_{be}$ with temperature. Thus, in operation, the magnitude of the write current remains substantially constant.

Another advantage of this feature is that the write current remains substantially constant from one tape drive to another tape drive since its magnitude is not affected by the electrical characteristics of the two transistors 30, 32. Of course, there is a slight variation from tape drive to tape drive since the value of the current control resistor 34 may not be identical; however, this difference will only be on the order of 1% since precision tolerance resistors are used.

A further advantage of this feature is the provision of a symmetric write current. As defined above, a write current is symmetric if the magnitude of the write current traveling through one portion of the winding of the write head equals the magnitude of the current traveling through the other portion of the winding of the write head. In order to maximize the integrity of the magnetic information written to the tape, it is highly desirable to have a symmetric write current. Symmetry of the write current is provided by the attachment of both of the emitters of the transistors 30, 32 to the same current control resistor 34 and inverting input of the operational amplifier 36. Since the magnitude of the write current is dependent only on the value of the current control resistor 34 and the emitter voltage $V_e$, the magnitude of the write current through the transistors 30, 32 is not dependent on the electrical characteristics of either of the transistors 30, 32 and is symmetric.

Another feature of the described embodiment is the prevention of undesirable write currents. To this end, four diodes 56, 58, 60, 62 are connected between the windings 10, 12 and the switching transistors 30, 32. The placement of the four diodes 56, 58, 60, 62 prevents undesired current flow through the nonselected write head. For example, when the winding 12 is energized with a high voltage and the switching transistor 30 is activated, the desired current flow path is through the upper winding portion 20, the transistor 30, and the current control resistor 34 to ground. However, if the diode 58 was not provided, an undesirable flow path would allow current to flow downwards through the bottom winding portion 24, upwards through the upper and lower winding portions 14, 18 of the nonselected write head, and through the transistor 30 and the current control resistor 34 to ground. The diodes 56, 58, 60, 62 prevent other similar undesirable current paths.

The write circuit also provides an increased write current during the initial portion of each write cycle. The increased write current, or precompensation current, is facilitated by a transistor 64 whose collector is attached to the emitters of the two switching transistors 30, 32 through a resistor 66. The base of the transistor 64 is attached to a high current ("HCUR") signal generated by a conventional circuit (not shown) which saturates the transistor 64 when the HCUR signal is activated. When saturated, the transistor 64 acts as a short circuit, and the resistor 66 is effectively placed in parallel with the current control resistor 34. Since the magnitude of the write current depends upon the resistance seen at the emitters of the write current switching transistors 30, 32, when the resistor 66 is placed in parallel with the current control resistor 34, the combined resistance decreases and the magnitude of the write current increases. Like the resistor 34, the resistor 66 also has a precision tolerance of 1%, but has a value of 432 ohms. Thus, the magnitude of the increased precompensation current, which is 5 volts divided by the 187 ohm parallel resistance of the resistors 34, 66, is 27 milliamperes. Since precompensation is only used during the initial portion of a write cycle, the transistor 64 and one of the write current transistors 30, 32 is simultaneously switched on, but the transistor 64 is turned off before the write current switching transistor is turned off so that the write current will return to its normal magnitude after the initial increase.

In operation, the write circuit enables the streaming cartridge tape drive to record information in serpentine data tracks. Initially, the write heads, which are vertically displaced from each other, are moved to a first vertical position on the magnetic tape. After being so positioned, one of the write heads is energized by the HSEL signal. As the tape moves across the write head, the transistors 30, 32 are switched at the data recording rate by the WD and the $\overline{\text{WD}}$ signals. After one data track is recorded along the entire length of the tape, the HSEL signal is complemented in order to energize the other write head, which occupies another vertical position with respect to the tape. After the second data track is recorded along the length of the tape at the second vertical position, the heads are vertically displaced to write data tracks at other vertical positions on the tape.

During recording, the magnitude of the write current provided by the write circuit is extremely uniform, varying only by approximately one percent due to the tolerance of the reference source connected to the operational amplifier 36. The magnitude of the write current does not vary substantially with temperature. The write current is also symmetric since the emitters of the transistors 30, 32 are coupled to the operational amplifier 36 and the current control resistor 34. As a result, magnetic information is recorded on the tape in an extremely uniform fashion.

Furthermore, since the magnitude of the write current depends only on the electrical characteristics of the current control resistor 34 and the reference source, and not those of the switching transistors 30, 32 and their associated biasing elements, variations in write current from one tape drive to another tape drive are minimized. Consequently, the accuracy of the retrieval of magnetic information from magnetic tapes recorded by other tape drives is enhanced.

Modifications and alternative embodiments of the invention will be apparent to those skilled in the art in view of the foregoing description. This description is to be construed as illustrative only and is for the purpose of teaching those skilled in the art the best mode of carrying out the invention. The details of the described embodiment may be varied substantially without departing from the spirit of the invention, and the exclusive use of all modifications which come within the scope of the appended claims is reserved.

What is claimed is:

1. A streaming cartridge tape drive for providing a substantially constant, symmetric write current, said tape drive comprising:
    a write head for writing magnetic information to magnetic tape;
    a tape transport system for moving magnetic tape across the write head to facilitate the writing of information to the tape;
    a first transistor coupled to said write head for providing a first current flow path through said write head;
    a second transistor coupled to said write head for providing a second current flow path through said write head; and
    an operational amplifier coupled to said first and second transistors for maintaining a substantially constant current flow that is symmetric with respect to the first and second transistors;
    wherein the inverting input of said operational amplifier is coupled to the emitters of said first and second transistors, the noninverting input of said operational amplifier is coupled to a reference voltage source, and the output of said operational amplifier is coupled to the bases of said first and second transistors.

2. A streaming cartridge tape drive as defined in claim 1 additionally comprising a first resistor coupled at one of its ends to the emitters of said first and second transistors and the inverting input of said operational amplifier and, at its other end, coupled to a ground reference.

3. A streaming cartridge tape drive as defined in claim 2 wherein said first resistor has at least a 1% tolerance.

4. A streaming cartridge tape drive as defined in claim 2 additionally comprising a write current switching circuit for selectively switching said first and second transistors, said write current switching circuit ensuring that only one of said first and second transistors provides a current flow path at any one time.

5. A streaming cartridge tape drive as defined in claim 4 wherein said write current switching circuit comprises a first pair of resistors coupled between the output of said operational amplifier and the bases of said first and second transistors.

6. A streaming cartridge tape drive as defined in claim 5 wherein said write current switching circuit additionally comprises a pair of NAND gates coupled to the bases of said first and second transistors.

7. A streaming cartridge tape drive as defined in claim 6 wherein each of said NAND gates comprises a transistor with an open collector.

8. A streaming cartridge tape drive as defined in claim 7 wherein said write current switching circuit additionally comprises a second pair of resistors coupled between said NAND gates and the bases of said first and second transistors.

9. A streaming cartridge tape drive for providing a substantially constant, symmetric write current, said tape drive comprising:
    a write head for writing magnetic information to magnetic tape;
    a tape transport system for moving magnetic tape across the write head to facilitate the writing of information to the tape;
    a first transistor coupled to said write head for providing a first current flow path through said write head;
    a second transistor coupled to said write head for providing a second current flow path through said write head
    an operational amplifier coupled to said first and second transistors for maintaining a substantially constant current flow that is symmetric with respect to the first and second transistors;
    a second write head coupled to said first and second transistors; and
    a write head select circuit for selecting one of said first and second write heads, said write head select circuit ensuring that said first and second transistors provide write current flow paths to only one of said write heads at a time.

10. A streaming cartridge tape drive as defined in claim 9 additionally comprising a plurality of diodes coupled between said first and second transistors and said write heads to prevent current flow through the write head not selected by said write head select circuit.

11. A streaming cartridge tape drive as defined in claim 10 additionally comprising:
    a third transistor coupled to said first and second transistors;
    a second transistor coupled between said first and second transistors and said third transistor, said second resistor increasing the magnitude of the write current through said first and second transistors by providing an additional write current flow path when said third transistor is in a conducting state; and
    means for switching said third transistor to a conducting state during the initial portion of a write cycle in order to provide an increased write current to said write heads.

12. A streaming cartridge tape drive for providing a substantially constant, symmetric write current, said tape drive comprising:
    a write head for writing magnetic information to magnetic tape;
    means for moving magnetic tape across said write head to facilitate the writing of information on the tape;
    first means having a first set of electrical characteristics for providing a write current through said write head in a first direction;
    second means having a second set of electrical characteristics for providing a write current through said write head in a second direction opposite said first direction;
    means for selectively activating said first and second write current providing means whereby said first and second write current providing means alternately provide write current through said write head; and
    means for regulating the current provided by said first and second write current providing means so that differences in the electrical characteristics of said first and second write current providing means do not contribute to variations in the magnitude of the write current, the write current provided in said first direction being substantially equal in magnitude to the write current provided in said second direction, said current regulating means comprising;
an operational amplifier; and
a pair of resistors coupled between the output of said operational amplifier and said first and second current providing means.

13. A streaming cartridge tape drive for providing a substantially constant write current, said tape drive comprising:
a write head for writing magnetic information to magnetic tape;
means for moving magnetic tape across said write head to facilitate the writing of information to the tape;
first means having a first set of electrical characteristics for providing write current through said write head in a first direction;
second means having a second set of electrical characteristics for providing write current through said write head in a second direction, said second direction being opposite to said first direction;
means for regulating the current provided by said first and second write current providing means so that the magnitude of the write current provided thereby is independent of the electrical characteristics of said first and second write current providing means, said current regulating means comprising:
an operational amplifier; and
a pair of resistors coupled between the output of said operational amplifier and said first and second current providing means; and
means for maintaining the current provided by said first write current providing means substantially constant to the current provided by said second write current providing means.

14. A streaming cartridge tape drive for providing a substantially symmetric write current, said tape drive comprising:
a write head for writing magnetic information to magnetic tape;
means for moving magnetic tape across said write head to facilitate the writing of information on the tape;
second means for providing write current through said write head in a second direction, said second direction being opposite said first direction; and
means for regulating the magnitude of the write current provided by said first and second write current providing means so that the magnitude of the write current provided by said first write current providing means substantially equals the magnitude of the write current provided by said second write current providing means, the magnitude of the write current provided by said first and second current providing means being independent of the electrical characteristics of the first and second current providing means, said current regulating means comprising:
an operational amplifier; and
a pair of resistors coupled between the output of said operational amplifier and said first and second current providing means.

15. A circuit for recording information on a magnetic medium, said circuit coupled to a current responsive write head, said circuit comprising:
a driving transistor coupled to the write head;
a reference resistor coupled to said driving transistor, said driving transistor and said reference resistor providing a current flow path to said write head;
an operational amplifier coupled to said driving transistor so that one input of said operational amplifier is coupled to said driving transistor and said reference resistor, the other input of said operational amplifier is coupled to a reference voltage source, and the output of said operational amplifier is coupled to the control input of said driving transistor, said operational amplifier being responsive to a voltage across said reference resistor, the voltage being proportional to the current through the write head, so that said operational amplifier applies a control signal to said control input of said transistor to maintain a substantially constant current through said reference resistor.

16. A magnetic recording circuit as claimed in claim 15, wherein the driving transistor is a npn type transistor, and said reference resistor is connected to the emitter of said transistor.

17. A magnetic recording circuit as claimed in claim 15 further comprising a switchable circuit for increasing the current during a selected time interval so that the switchable circuit is energized at the beginning of the write cycle to increase the magnitude of the current flow, and then, subsequently, the switchable circuit is switched off before the end of the write cycle to decrease the current to said substantially constant current level.

18. A magnetic recording circuit as claimed in claim 17 wherein the switchable circuit comprises a current increasing resistor, a switching transistor, and a means for switching the switching transistor on and off, said current increasing resistor being coupled to the switching transistor and also to the output of the driving transistor so that the current increasing resistor shunts the reference resistor when the switching transistor has been switched on.

19. A magnetic recording circuit as defined in claim 18 wherein said reference resistor has at least a 1% tolerance.

20. A magnetic recording circuit as defined in claim 15, additionally comprising:
a second write head coupled to said driving transistor; and
a write head select circuit for selecting one of said first and second write heads, said write head select circuit ensuring that said transistor provides write current flow paths to only one of said write heads at any time instant.

21. A circuit for recording information on a magnetic medium, said circuit being coupled to a write head having a first recording winding to record a signal of a first polarity on the magnetic medium, and also having a second recording winding to record a second polarity, the first and the second windings being electrically connected to a common supply circuit, said magnetic recording circuit comprising:
a first driving transistor coupled to the first recording winding;
a second driving transistor coupled to the second recording winding;

a reference resistor coupled at a node to an output of said first driving transistor, and also coupled to an output of the second transistor, whereby a first current flow path through said write head is defined by the first winding, the first transistor, and the reference resistor, and a second current flow path is defined by the second winding, the second transistor, and the reference resistor;

means for selectively activating either the first transistor or the second transistor to select the polarity of the signal to be recorded; and an operational amplifier coupled to said first and second driving transistors so that one input of said operational amplifier is coupled to said node, the other input of said operational amplifier is coupled to a reference voltage source, and the output of said operational amplifier is coupled to the control input of said driving transistor, said operational amplifier being responsive to a voltage across said reference resistor, the voltage being proportional to the current through the write head, so that said operational amplifier applies a control signal to said control input of said transistor to maintain a substantially constant current through said reference resistor.

22. A magnetic recording circuit as claimed in claim 21 further comprising a switchable circuit for increasing the current during a selected time interval whereby the current is initially at the increased level at the start of the write cycle, and then decreased to the said substantially constant current level before the end of the write cycle.

23. A magnetic recording circuit as claimed in claim 22 wherein the switchable circuit comprises a current increasing resistor, a switching transistor, and a means for switching the switching transistor on and off, said current increasing resistor being coupled to the switching transistor and also to the node connecting the first and the second transistors with the reference resistor so that the current increasing resistor shunts the reference resistor when the switching transistor has been switched on.

24. A magnetic recording circuit as defined in claim 23 wherein said reference resistor has at least a 1% tolerance.

25. A magnetic recording circuit as defined in claim 21, additionally comprising:

a second write head coupled to said driving transistor; and a write head select circuit for selecting one of said first and second write heads, said write head select circuit ensuring that the selected transistor provides write current flow paths to only one of said write heads at any time instant.

26. A magnetic recording circuit as defined in claim 21 wherein the first and the second transistors are npn transistors, the inverting input of said operational amplifier is coupled to the emitters of said first and second transistors, the noninverting input of said operational amplifier is coupled to a reference voltage source, and the output of said operational amplifier is coupled to the bases of said first and second transistors.

27. A magnetic recording circuit as defined in claim 22 wherein said write selection means additionally comprises a pair of NAND gates coupled to the bases of said first and second transistors.

28. A magnetic recording circuit as defined in claim 25 additionally comprising a plurality of diodes coupled between said first and second transistors and said write heads to prevent current flow through the write head not selected by said write head select circuit.

* * * * *